(12) United States Patent
Kuroki

(10) Patent No.: US 7,618,064 B2
(45) Date of Patent: Nov. 17, 2009

(54) ATTACHMENT CONSTRUCTION FOR SEAT BELT SYSTEM PROVIDED WITH PRETENSIONER MECHANISM

(75) Inventor: Yohei Kuroki, Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 34 days.

(21) Appl. No.: 11/453,121

(22) Filed: Jun. 14, 2006

(65) Prior Publication Data

US 2007/0029774 A1 Feb. 8, 2007

(30) Foreign Application Priority Data

Aug. 5, 2005 (JP) ............................ P2005-227961

(51) Int. Cl.
*B60R 22/46* (2006.01)
(52) U.S. Cl. ...................................... 280/806
(58) Field of Classification Search ................ 280/806, 280/803, 802, 801.1, 808
See application file for complete search history.

(56) References Cited

U.S. PATENT DOCUMENTS

| | | | | |
|---|---|---|---|---|
| 4,615,540 | A * | 10/1986 | Sedlmayr et al. | 280/806 |
| 5,129,680 | A * | 7/1992 | Mori | 280/806 |
| 5,346,152 | A * | 9/1994 | Fohl | 242/371 |
| 5,403,037 | A * | 4/1995 | Fohl | 280/806 |
| 5,478,115 | A * | 12/1995 | Matsuki et al. | 280/806 |
| 5,692,780 | A * | 12/1997 | Yasui | 280/801.2 |
| 5,769,456 | A | 6/1998 | Juchem et al. | |
| 6,186,549 | B1 * | 2/2001 | Specht et al. | 280/806 |
| 6,527,299 | B2 * | 3/2003 | Specht et al. | 280/806 |
| 7,118,132 | B2 * | 10/2006 | Terasaki | 280/806 |
| 2002/0105181 | A1 | 8/2002 | Specht et al. | |
| 2003/0094805 | A1 * | 5/2003 | Mori | 280/806 |
| 2003/0122362 | A1 * | 7/2003 | Ukita et al. | 280/806 |
| 2003/0184076 | A1 * | 10/2003 | Devereaux et al. | 280/806 |
| 2003/0222451 | A1 * | 12/2003 | Niimi | 280/801.1 |
| 2004/0150210 | A1 * | 8/2004 | Cunningham et al. | 280/806 |
| 2004/0212188 | A1 * | 10/2004 | Terasaki | 280/806 |
| 2004/0256850 | A1 * | 12/2004 | Yamaguchi | 280/806 |
| 2006/0087108 | A1 * | 4/2006 | Midorikawa | 280/806 |
| 2007/0085318 | A1 * | 4/2007 | Stevens | 280/806 |
| 2009/0108577 | A1 * | 4/2009 | Hirotani | 280/802 |

FOREIGN PATENT DOCUMENTS

| | | |
|---|---|---|
| DE | 33 07 093 | 9/1983 |
| DE | 43 41 119 | 6/1995 |
| DE | 10105500 | 8/2002 |
| EP | 0 087 625 | 9/1983 |
| JP | 2501075 B2 | 3/1996 |
| JP | 2005-081886 A | 3/2005 |

OTHER PUBLICATIONS

Office Action from corresponding German Application No. 102006035923.2.

* cited by examiner

*Primary Examiner*—Christopher P Ellis
*Assistant Examiner*—Karen Jane Amores
(74) *Attorney, Agent, or Firm*—Lerner, David, Littenberg, Krumholz & Mentlik, LLP

(57) ABSTRACT

The present invention provides an attachment construction for a seat belt system provided with a pretensioner mechanism, in which a lap anchor in a locking portion for fixing one end of a seat belt to a vehicle body has a gas generator and a tubular cylinder portion. The cylinder portion or the cylinder portion and the gas generator are arranged between a pillar and a pillar trim covering the cabin side of the pillar.

19 Claims, 5 Drawing Sheets

ATTACHMENT CONSTRUCTION FOR SEAT BELT SYSTEM PROVIDED WITH PRETENSIONER MECHANISM

BACKGROUND OF THE INVENTION AND RELATED ART STATEMENT

1. Field of the Invention

The present invention relates to a construction for attaching, to a vehicle body, a seat belt system provided with a pretensioner mechanism in a locking portion, which mechanism is a means for tightening a seat belt in an emergency such as vehicle collision, the construction being applied to a vehicle provided with the seat belt on a seat, such as an automobile, industrial vehicle, construction machine, etc.

2. Description of Related Art

Some band-shaped safety belts (seat belts) of a seat belt system for restraining a vehicle passenger on a seat in an emergency such as vehicle collision are provided with what is called a pretensioner mechanism. The pretensioner mechanism is a mechanism for enhancing passenger restraining performance by increasing the tension of a seat belt by a cooperative action of a gas generator and a piston in a cylinder portion to instantaneously tighten the belt and hence eliminate belt looseness with respect to the passenger.

This pretensioner mechanism is configured so that the belt is instantaneously pulled toward the vehicle body side by utilizing gas pressure etc., by which the looseness of the belt is eliminated, and the belt is made to adhere closely to the passenger's body to enhance the restraining performance.

As disclosed, for example, in Patent Document 1 (Japanese Patent No. 2501075), generally, a pretensioner mechanism utilizing gas pressure includes a gas generator and a tubular cylinder that accommodates a piston moved by the pressure of generated gas, and has a construction such that a gas generator is operated by transmitting a signal of a sensor for detecting an emergency state of the vehicle, such as collision, to the gas generator via a harness and a connector, and the piston connected to the belt via a wire etc. is moved in the cylinder by the gas pressure sent from the gas generator, by which the belt is pulled in.

The above-described pretensioner mechanism is provided at a location at which mainly the belt is fixed to the vehicle body, such as a belt winding device, buckle, or lap anchor (lateral lumbar anchor) portion, of components of the seat belt system.

Also, in Patent Document 2 (Japanese Patent Provisional Publication No. 2005-81886), the configuration is such that a dummy floor is provided above a floor panel, and the cylinder portion of a pretensioner mechanism is arranged lying under the dummy floor together with a gas generator and a connector for transmitting electrical signals, by which the component members of the pretensioner mechanism are protected from an external force exerted by the passenger's foot etc. at the time of getting on and off and from water at the time of rainfall.

However, the above-described conventional techniques have the below problems.

The technique described in Patent Document 1 merely provides a pretensioner which is itself configured so that the gas generator is operated by transmitting a signal from a sensor which detects a vehicle emergency state, such as a collision, to the gas generator via the harness and the connector, and the piston connected to the belt via a wire etc. is moved in the cylinder by the gas pressure sent from the gas generator, by which the belt is pulled in. A construction for attaching the pretensioner mechanism to the vehicle body side is not disclosed.

Also, in the technique described in Patent Document 2, the configuration is such that the cylinder portion of pretensioner mechanism is arranged lying together with the gas generator and the connector for transmitting electrical signals, by which the component members of the pretensioner mechanism are protected from an external force exerted by the passenger's foot etc. at the time of getting on and off and from water at the time of rainfall. In this case, the dummy floor must be provided separately, and thus a space for installing the dummy floor is needed, so that there is a danger that the system becomes complicated and large.

Further, the pretensioner mechanism must be provided under the floor surface in the vehicle cabin. Therefore, this technique has a drawback in that the vertical range in which the pretensioner mechanism is installed is restricted.

OBJECT AND SUMMARY OF THE INVENTION

The present invention has been made in view of the above circumstances, and accordingly an object thereof is to provide an attachment construction for a seat belt system provided with a pretensioner mechanism, in which a separate protective member or cover need not be provided, the number of parts is small and the construction is simple, the strength around the attachment portion of the pretensioner mechanism is kept, the assemblability of the pretensioner mechanism and the related members is kept high, and further the operability at the time when a seat belt is worn and at the time when the seat belt is not worn is kept high.

To solve the problems with the conventional techniques, the present invention provides an attachment construction for a seat belt system provided with a pretensioner mechanism having a gas generator and a tubular cylinder portion connected to the gas generator in a locking portion for fixing one end of a seat belt to a vehicle body, wherein the cylinder portion or the cylinder portion and the gas generator are arranged between a pillar constituting a vehicle side portion and an interior member covering the cabin side of the pillar.

In the present invention, specifically, the configuration is preferably as follows:

(1) The cylinder portion is arranged so as to extend substantially along the up-and-down direction of the pillar.

(2) The tip end portion of the cylinder portion is fixed to the pillar via a fixing means.

(3) The cylinder portion is arranged so as to be put across a retractor mounting hole for installing a retractor, which is a winding means for the seat belt.

(4) The locking portion is fixed to the pillar, and the cylinder portion is covered with the interior member together with the locking portion.

(5) A reinforcing member for fixing the retractor is provided on the pillar, and the locking portion is fixed in the range in which the reinforcing member is installed.

Also, in the present invention, a slit portion having one end open is provided in a lower part of the interior member, the seat belt connected to the locking portion is guided to the cabin inside through the slit portion, and the connection range of the seat belt is arranged so as to be exposed to the cabin inside.

In the present invention, specifically, the configuration is preferably as follows:

(1) A concave portion facing to the outside in a vehicle width direction is provided in a lower part of the interior member, and the slit portion is provided on a surface continuous from a surface at a position at which the fixing portion of the pillar in the locking portion of the interior member is covered to the bottom surface of the concave portion.

(2) The position of a terminal edge on an upper side in the slit portion is provided on a line on which a wire connected to the locking portion in a state in which the seat belt system is not worn passes, and the tip end portion of the slit portion is formed into an arcuate shape having a diameter at least larger than the diameter of the wire.

(3) A convex portion is provided at an intermediate position of an edge portion located on the rear side in a front-and-rear direction of vehicle of the slit portion, the convex portion is provided on a line on which the wire connected to the locking portion in a state in which the seat belt system is worn passes, and the tip end portion of the convex portion is formed into an arcuate shape having a diameter at least larger than the diameter of the wire.

(4) At least any one of a line in the edge portion from a lower end opening portion to the terminal edge at the upper end of the slit portion, a line in the edge portion from the terminal edge to the convex portion, and a line in the edge portion from the convex portion to the lower end opening portion is formed in an arcuate shape such as to be convex toward the inside of the slit portion.

As described above, the attachment construction for a seat belt system provided with a pretensioner mechanism in accordance with the present invention has the gas generator and the tubular cylinder portion connected to the gas cylinder in the locking portion for fixing one end of the seat belt to the vehicle body, and the cylinder portion or the cylinder portion and the gas generator are arranged between the pillar constituting the vehicle side portion and the interior member covering the cabin side of the pillar. Therefore, there is no danger that the pretensioner mechanism is affected by an external force exerted by the passenger's foot at the time of getting on and off or by water at the time of rainfall, and there can be obtained a seat belt system provided with a pretensioner mechanism, in which a protective cover need not be provided separately, the construction is simple and the cost is low, and the reliability is high.

Also, the locking portion provided with the pretensioner mechanism is configured so that the installation position of the locking portion is not restricted to a position lower than a door opening portion such as a side sill, and the vertical position thereof can be set freely along the pillar such as a center pillar. Therefore, the degree of freedom of the layout of a lap anchor, which is the locking portion, can be increased.

According to the present invention, since the cylinder portion is arranged so as to extend substantially along the up-and-down direction of the pillar, even in the case where the center pillar is made thin to widen the door opening area, the cylinder portion can be accommodated in the center pillar. Therefore, the arrangement space in the front-and-rear direction of vehicle for the seat belt system provided with a pretensioner mechanism can be made compact.

Also, according to the present invention, since the tip end portion of the cylinder portion is fixed to the pillar via the fixing means, the installation rigidity of the cylinder portion increases, so that a phenomenon that the cylinder portion is oscillated by vibrations etc. during the running of vehicle, and hits the pillar or the interior member, by which noise is generated can be prevented.

Further, according to the present invention, since the cylinder portion is arranged so as to be put across a retractor mounting hole for installing a retractor, which is a winding means for the seat belt, an effect that a decrease in strength of the pillar due to the formation of the mounting hole is reinforced by the fixture of the cylinder portion can be achieved.

Still further, according to the present invention, since the locking portion is fixed to the pillar, and the cylinder portion is covered with the interior member together with the locking portion, there is no need for separately providing a cover for the locking portion, the number of parts can be decreased, and the degree of freedom of the layout of the locking portion in the vertical direction can be increased.

Moreover, according to the present invention, since the reinforcing member (reinforce) for fixing the retractor is provided on the pillar, and the locking portion is fixed in the range in which the reinforcing member is installed, the reinforcing member for improving the installation strength of retractor is also used to reinforce the locking portion. Therefore, a reinforcing member for reinforcing the locking portion need not be provided separately, so that the construction can be simplified and the number of parts can be decreased without a decrease in strength of the locking portion.

Also, according to the present invention, the slit portion having one end open is provided in a lower part of the interior member (pillar trim), the seat belt connected to the locking portion is guided to the cabin inside through the slit portion, and the connection range of the seat belt is arranged so as to be exposed to the cabin inside, so that the seat belt or the seat belt covered with a cover can be inserted easily in the slit portion through the opening portion of the slit portion from the downside of the pillar trim of the interior member. Therefore, after the seat belt system has been attached to the pillar, the pillar trim can be installed to the pillar in such a manner as to be inserted from the upside. Thereby, the lap anchor of the locking portion provided with a pretensioner mechanism can be arranged in the interior member without decreasing the assemblability.

Further, according to the present invention, since the concave portion facing to the outside in a vehicle width direction is provided in a lower part of the interior member (pillar trim), and the slit portion is provided on the surface continuous from the surface at the position at which the fixing portion of the pillar in the locking portion of the interior member is covered to the bottom surface of the concave portion, the slit portion can be arranged on a surface facing to the front in the front-and-rear direction of vehicle, and hence the slit portion can be arranged at a position at which the direction of a seat belt pulled out toward the front at the time when the seat belt is worn is not bent at an intermediate position. Thereby, the arrangement of the seat belt at the time when the seat belt is worn can be kept in a preferable state. Moreover, by providing the concave portion, the seat belt can be brought closest to the pillar easily, so that the influence of the seat belt with the pillar trim in a location in which the movement is large can be avoided or alleviated.

Also, according to the present invention, the position of the terminal edge on an upper side in the slit portion is provided on the line on which the wire connected to the locking portion in a state in which the seat belt system is not worn passes, and the tip end portion of the slit portion is formed into an arcuate shape having a diameter at least larger than the diameter of the wire, or the convex portion is provided at an intermediate position of the edge portion located on the rear side in a front-and-rear direction of vehicle of the slit portion, the convex portion is provided on the line on which the wire connected to the locking portion in a state in which the seat belt system is worn passes, and the tip end portion of the convex portion is formed into an arcuate shape having a diameter at least larger than the diameter of the wire. Therefore, both at the time when the seat belt is worn and at the time when it is stored, the laying line of the wire in the cover can be held in a straight line shape without bending.

Further, according to the present invention, since at least any one of the line in the edge portion from the lower end opening portion to the terminal edge at the upper end of the slit portion, the line in the edge portion from the terminal edge to the convex portion, and the line in the edge portion from the convex portion to the lower end opening portion is formed in an arcuate shape such as to be convex toward the inside of the slit portion, the width of the slit portion can be made as narrow as possible, and hence the inside of the slit portion can be made invisible, so that the appearance quality can be improved.

In effect, according to the present invention, there is no need for providing a protective member or a cover for preventing the influence of an external force exerted by the passenger's foot etc. at the time of getting on and off and of water at the time of rainfall. Also, reinforcement for installing the locking portion (lap anchor) in the seat belt system is not needed, and the strength of a mounting hole forming portion for installing the retractor in the pillar (center pillar) can be improved.

Also, according to the present invention, the pretensioner mechanism can be accommodated in the pillar (center pillar) in a compact manner without impairing the assemblability of the interior member (pillar trim), so that the degree of freedom of the layout of the locking portion in the vertical direction can be increased. Further, both at the time when the seat belt is worn and at the time when it is not worn, the belt line on the locking portion (lap anchor) side of the seat belt can be kept in an ideal state, and the interference between the seat belt and the pillar trim can be avoided.

DETAILED DESCRIPTION OF PREFERRED EMBODIMENTS

The present invention will now be described with reference to an embodiment shown in the accompanying drawings.

Figure 1:
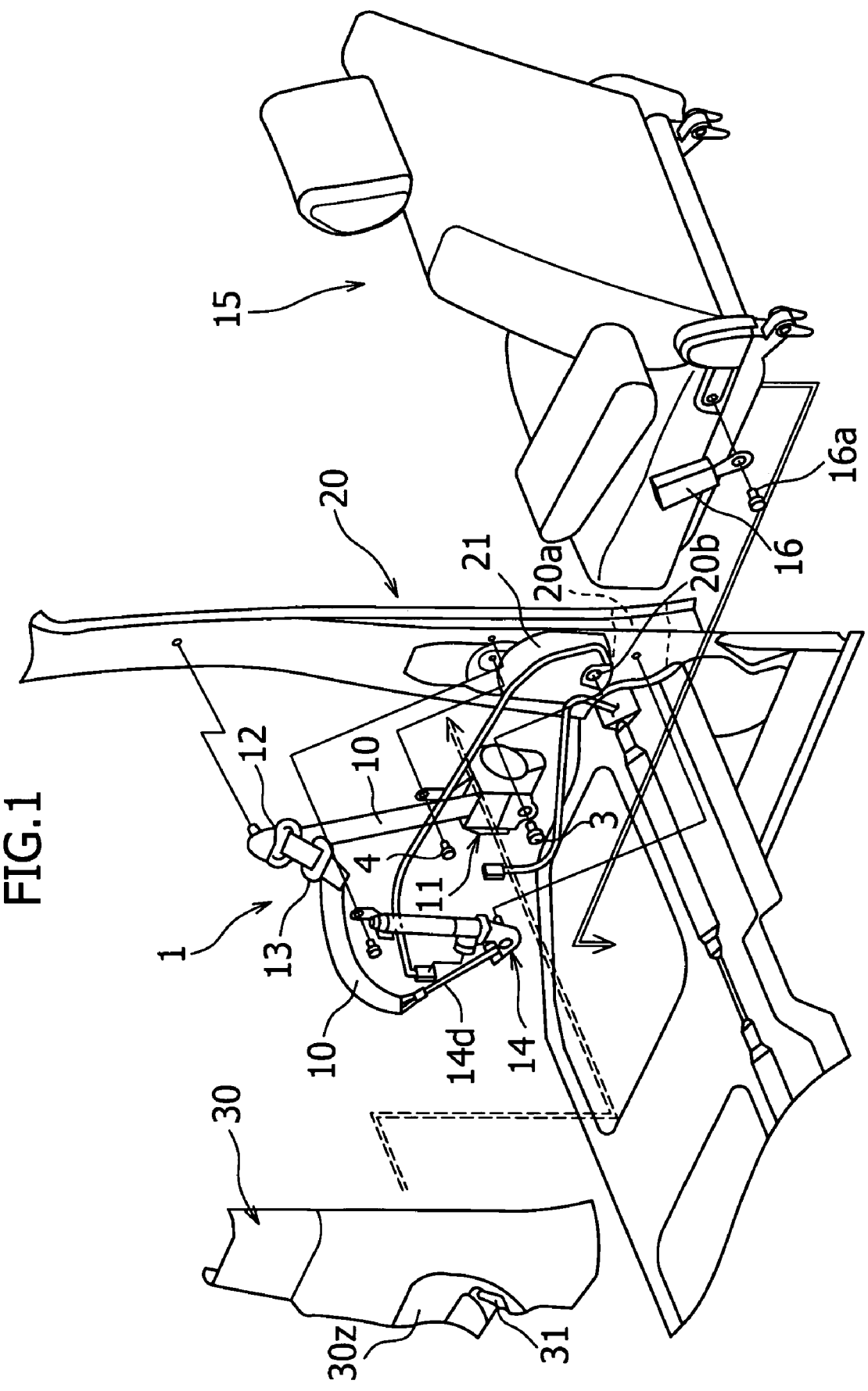
FIG. 1 is an exploded perspective view showing an attachment construction for a seat belt system provided with a pretensioner in accordance with an embodiment of the present invention.

FIG. 1 is an exploded perspective view showing an attachment construction for a seat belt system provided with a pretensioner in accordance with the embodiment of the present invention.

A seat belt system 1 shown in FIG. 1 is what is called a three point belt system that restrains the chest and the waist of a passenger seated on a seat 15, and a buckle 16 is attached to one-side side portion of the seat 15 via a bolt 16a. A belt (seat belt) 10 of the seat belt system 1 is fitted with a tongue 13 (described later in detail). When the tongue 13 is engaged with the buckle 16, the passenger's body is restrained on the seat 15 by the seat belt 10.

Such a seat belt system 1 includes a retractor 11 that is a belt winding means provided in one end portion of the seat belt 10 and a lap anchor 14 serving as a locking portion provided in the other end portion of the seat belt 10. Between the retractor 11 and the lap anchor 14, a shoulder anchor 12 and the tongue 13 are inserted so as to be movable along the seat belt 10.

Figure 2:
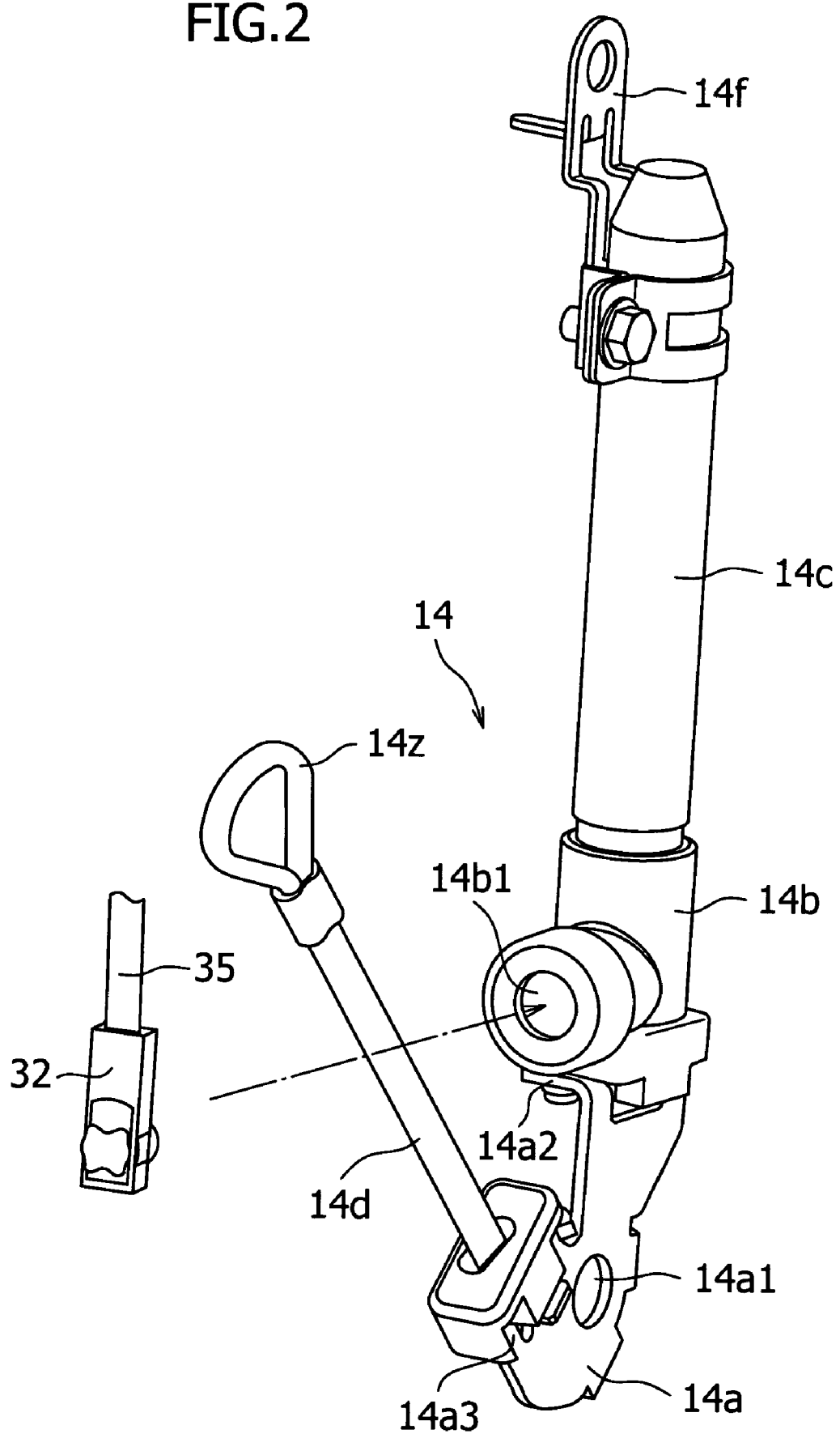
FIG. 2 is an enlarged perspective view of a lap anchor (locking portion) in an embodiment of the present invention.

FIG. 2 is an enlarged perspective view of a lap anchor (locking portion) 14 in the above-described embodiment.

The lap anchor 14 is provided with a pretensioner mechanism for pulling in the seat belt 10 instantaneously in an emergency, and the pretensioner mechanism in accordance with the embodiment of the present invention is configured as described below.

The lap anchor 14 is provided with an anchor plate 14a for fixing the lap anchor 14 to a vehicle body, so that the lap anchor 14 is fastened to the vehicle body by inserting a fastening member such as a bolt 14g into a hole 14a1 formed in the anchor plate 14a. The anchor plate 14a is provided with an attachment end portion 14a2 formed by extending a part of the anchor plate 14a upward. The attachment end portion 14a2 is fitted with a gas generator 14b, and the gas generator 14b is connected with a tubular cylinder 14c. This cylinder 14c is arranged so as to extend substantially along the up-and-down direction of a center pillar 20.

In the cylinder 14c, a piston, not shown, that is moved by gas pressure is housed so as to be movable reciprocatingly. A wire 14d connected to the piston is supported on a support end portion 14a3 extending slantwise upward while being located at an end portion separate from the attachment end portion 14a2 of the anchor plate 14a through a pulley (not shown) tightened together with the anchor plate 14a. In an upper part of the cylinder 14c, a bracket (fixing means) 14f for attaching the lap anchor 14 to the center pillar 20 on the vehicle body side is provided.

Figure 3:
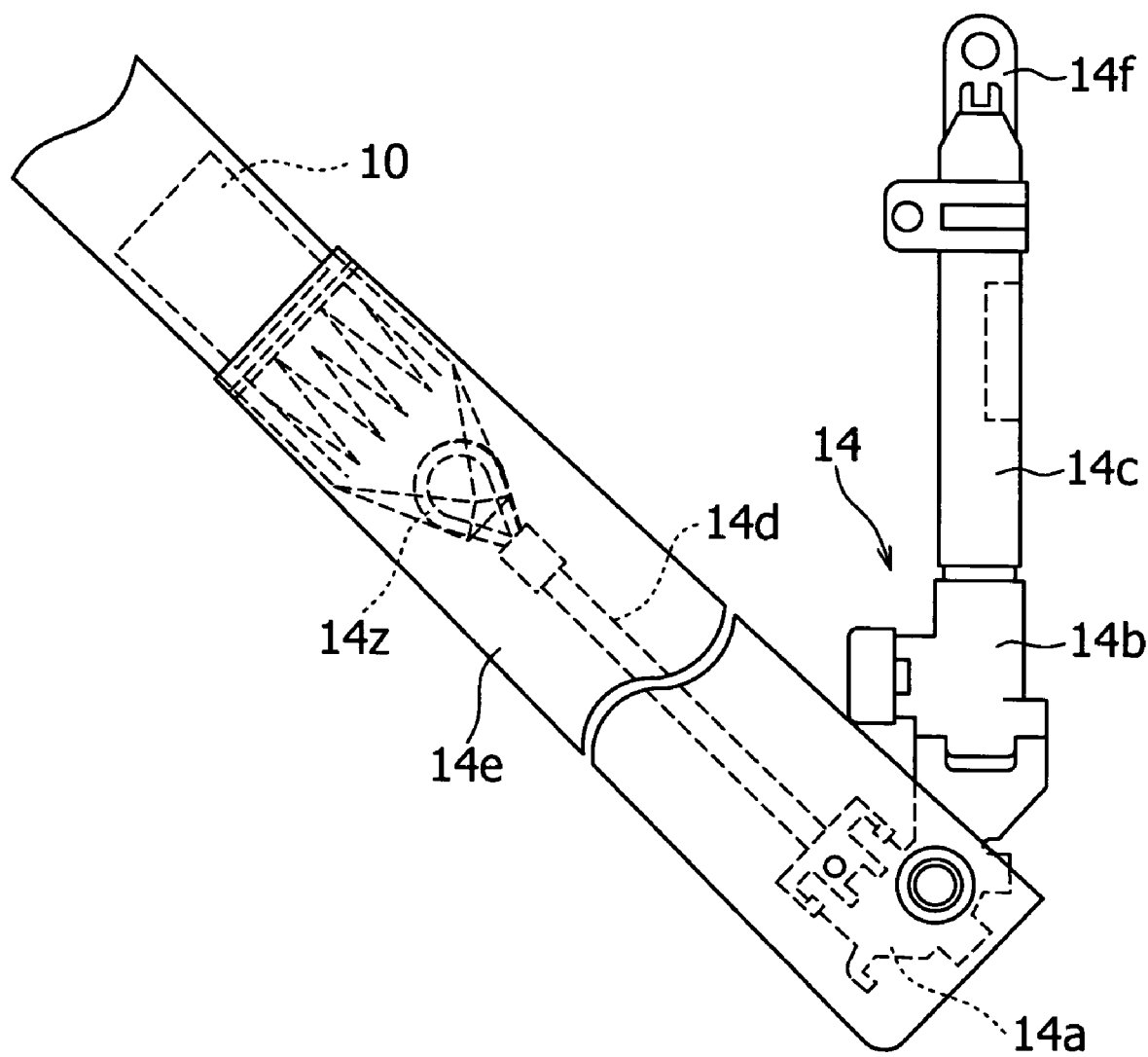
FIG. 3 is a side view of an essential portion showing a cover portion of wire and a lap anchor in an embodiment of the present invention.

Also, the tip end portion of the wire 14d is formed into a loop shape, and as shown in FIG. 1, the end portion of the seat belt 10 is inserted in this loop-shaped portion 14z and is sewed together, by which the seat belt 10 is connected to the wire 14d. The exposed portion of the wire 14d is covered with a cover 14e made of a cloth or resin as shown in FIG. 3.

Further, the gas generator 14b is provided with an insertion port 14b1 for connecting a harness 35 and a connector 32 for receiving detection signals from a sensor (not shown) for detecting the collision of vehicle.

When the lap anchor 14 provided with the pretensioner mechanism having the above-described basic configuration receives a signal from the sensor for detecting the collision of vehicle via the harness 35 and the connector 32, the gas generator 14b is operated to generate a gas, and therefore the piston (not shown) in the cylinder 14c is moved in the cylinder 14c toward the tip end side (upward in FIG. 2) by the pressure of the generated gas. Thereby, the wire 14d is pulled into the cylinder 14c, and hence the seat belt 10 is pulled in by being pulled by the wire 14d.

By such an operation, the seat belt 10 set on the lap of the passenger is tightened and comes into close contact with the passenger, so that forward movement of passenger caused by collision is restrained.

Next, returning to FIG. 1, the shoulder anchor 12 through which the seat belt 10 is inserted is installed in an upper portion of the center pillar 20 by a fastening member such as a bolt so as to be turnable around the fastening portion.

Also, at a location on the opposite side to the lap anchor 14 with respect to the seat 15, the buckle 16, which is a lateral lumbar anchor, is arranged. By locking the tongue 13 to the buckle 16, it is possible for the passenger to wear the seat belt system 1.

In the state in which the seat belt system 1 is worn, the seat belt 10 in the range from the shoulder anchor 12 to the tongue 13 is set on the passenger's chest slantwise from the shoulder to the waist to mainly restrain the upper body of the passenger, and the seat belt 10 in the range from the tongue 13 to the lap anchor 14 is set in the vehicle width direction at a position of the passenger's waist to restrain the waist of the passenger.

In FIG. 1, the retractor 11 for letting in or out the seat belt 10 is inserted in a retractor mounting hole 21 provided in a lower part of the center pillar 20 erected at the side of the vehicle body, and is fixed to the wall surface of the center pillar 20 by a fastening member such as a bolt 3 in a state of being arranged so as to be put across the mounting hole 21. Further, an upper part of the retractor 11 may be fixed by a fastening member such as a screw 4.

On the lower side of the mounting hole 21 in the center pillar 20, a reinforce 20a, which is a reinforcing member, is arranged lappingly, by which the installation strength is improved so as to withstand a load applied on the retractor 11. The anchor plate 14a in the locking portion is fixed within the range in which the reinforce 20a is installed.

Next, a construction in which the seat belt system 1 in accordance with the embodiment of the present invention is attached to the vehicle body is explained.

Figure 4:
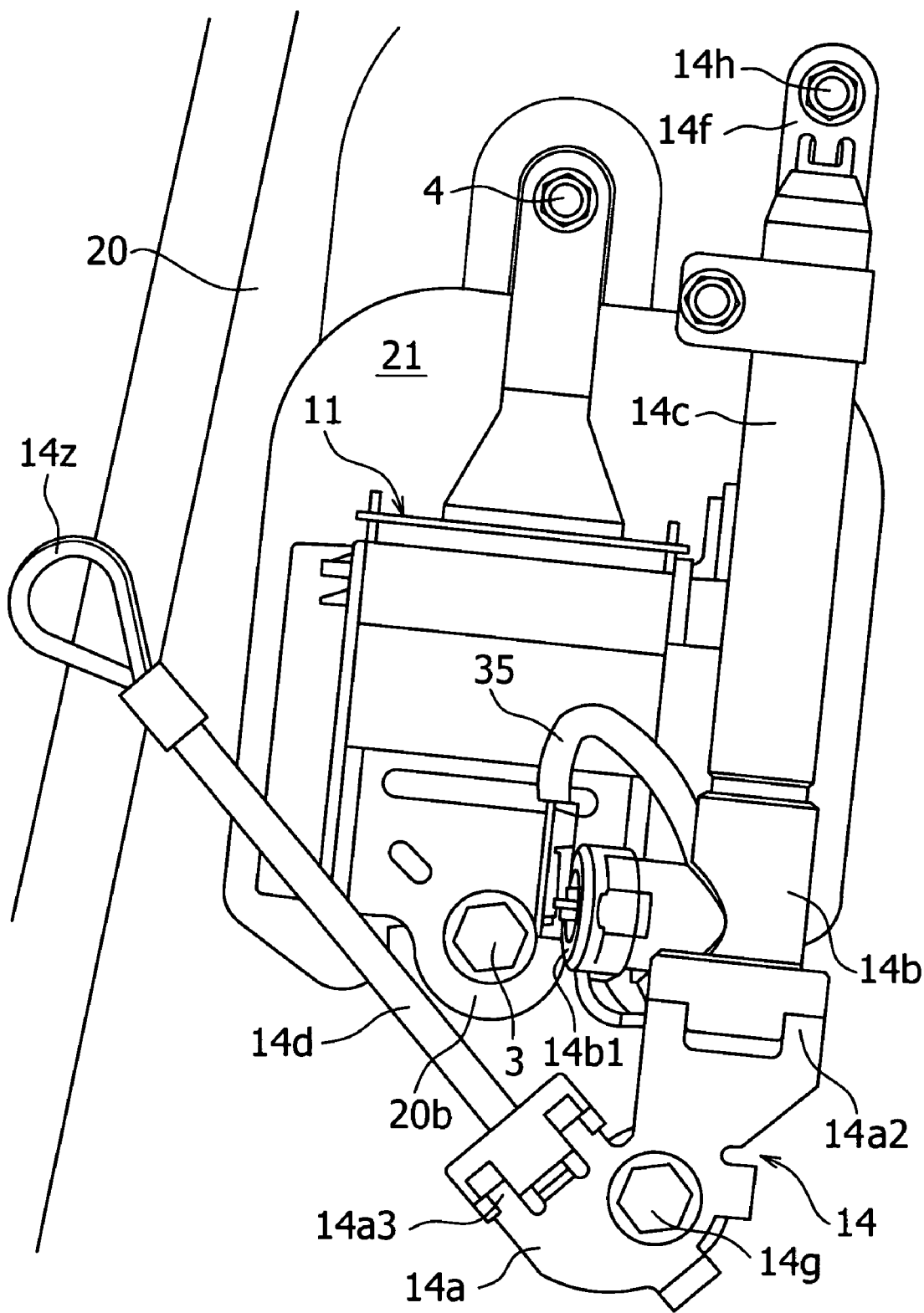
FIG. 4 is a partial front view showing a state in which a seat belt system is attached to a vehicle body in an embodiment of the present invention, in which an interior member is removed and a belt is omitted.

FIG. 4 is a partial front view showing a state in which the seat belt system is attached to the vehicle body in the embodiment, in which a pillar trim, which is an interior member, is removed and a belt is omitted.

In FIG. 4, the retractor 11 is inserted in the mounting hole 21 in the center pillar 20, and is fixed to the wall surface of the center pillar 20 with the bolt 3 and the screw 4. Below an attachment portion 20b (refer to FIGS. 1 and 4) in which the retractor 11 is attached to the center pillar 20, the lap anchor 14 is fixed by a fastening member such as the bolt 14g. As described above, in a location in which the retractor 11 and the anchor plate 14a are installed around the mounting hole 21, as shown in FIG. 1, the reinforce 20a is arranged to improve the installation strength of the retractor 11. There is no need for adding a separate reinforcing member for the lap anchor 14.

Further, as shown in FIG. 4, the cylinder 14c connected to the lap anchor 14 via the gas generator 14b is arranged so as to be erected in a form of extending substantially along the up-and-down direction (lengthwise direction) of the center pillar 20. By arranging the cylinder 14c so as to be erected in this manner, the arrangement space in the front-and-rear direction of the vehicle can be made compact as compared with the case where the cylinder is arranged so as to be laid along the floor as in the conventional art proposed by Patent Document 2. Also, even in the case where the center pillar 20 is made thin to widen the door opening area, the cylinder 14c can be accommodated in the center pillar 20.

Also, the cylinder 14c is arranged so as to be put across the mounting hole 21, which is formed in the center pillar 20 to mount the retractor 11, in the vertical direction, and an upper part of the cylinder 14c is fixed to the center pillar 20 via the bracket 14f by a fastening member such as a bolt 14h. Thereby, a decrease in strength of the center pillar 20 due to the formation of the mounting hole 21 is prevented, and hence a reinforcing effect can be achieved.

Moreover, since the tip end of the cylinder 14c is fixed to the vehicle body by the bracket 14f and the bolt 14h, there can be achieved, at the same time, an effect of preventing a phenomenon that the cylinder 14c is oscillated by vibrations etc. during the running of vehicle, and hits the center pillar 20 or the interior member, described later, by which noise is generated.

In this embodiment, as shown in FIG. 1, the harness 35 from the vehicle body side, which is connected to the insertion hole 14b1 in the gas generator 14b, is connected by being pulled out through the mounting hole 21 for the retractor 11. By this configuration, a protective member for protecting the harness together with the pretensioner mechanism arranged on the floor surface as in the conventional art can be omitted.

In the attachment construction in accordance with the embodiment of the present invention, after the seat belt system 1 has been attached to the center pillar 20 as described above, the cabin side of the center pillar 20 is covered with a pillar trim 30, which is the interior member, as shown in FIG. 1. Therefore, the lap anchor 14 provided with the pretensioner mechanism is also covered with the pillar trim 30 together with the retractor 11.

Thus, since the lap anchor 14 is fixed to the center pillar 20 near the retractor 11 and is covered with the pillar trim 30, there is no danger of being affected by an external force exerted by the passenger's foot at the time of getting on and off and by water at the time of rainfall, and hence a protective cover or the like need not be provided separately as compared with the case where the pretensioner is arranged on the floor surface as in the conventional art.

Also, the installation position of the lap anchor 14 is not restricted to a position lower than a door opening portion such as a side sill, and the vertical position thereof can be set freely along the center pillar 20. Therefore, the degree of freedom of the layout of the lap anchor 14 can be increased.

Figure 5:
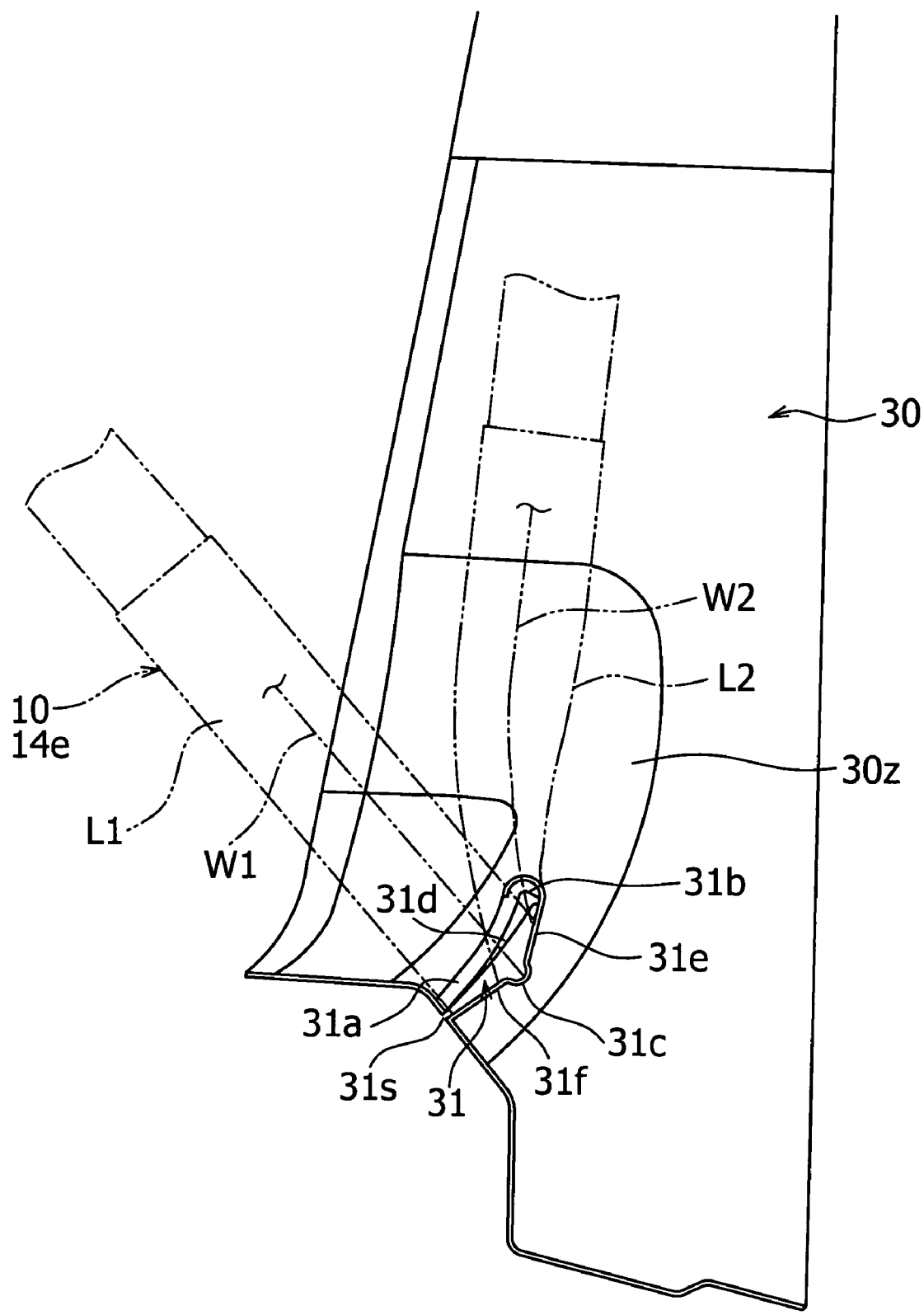
FIG. 5 is a partial enlarged side view showing a portion in which a pillar trim is attached to a center pillar in an embodiment of the present invention.

FIG. 5 is a partial enlarged side view showing a portion in which the pillar trim is attached to the center pillar.

As shown in FIG. 5, the pillar trim 30 is formed so as to have a shape such that the width increases downward so as to match the shape of the center pillar 20. In the lower end portion of the pillar trim 30 is formed a slit 31, and the seat belt 10 in the range of being covered with the cover 14e (refer to FIG. 3) of the lap anchor 14 is inserted through the slit 31. Thereby, the seat belt 10 is guided to the inside of cabin, and the connection range of the seat belt 10 is arranged so as to be exposed to the inside of the cabin.

The slit 31 is formed into a shape such that the lower end side is open in an opening portion 31s, and thereby the seat belt 10 or the cover 14e is inserted easily from the downside of the pillar trim 30. Therefore, after the seat belt system 1 has been attached to the center pillar 20, the pillar trim 30 can be attached to the center pillar 20 so as to be inserted from the upside, so that the lap anchor 14, which is the locking portion provided with the pretensioner mechanism, can be arranged in the pillar trim 30 without decreasing assemblability.

In a lower part of the pillar trim 30, a concave portion 30z facing to the outside in the vehicle width direction is provided on the vehicle front side of a location such as to cover the cylinder 14c and the gas generator 14b, which constitute the pretensioner mechanism of the lap anchor 14. On a surface continuous from the bottom surface of the concave portion 30z to the surface of the pillar trim 30 covering the cylinder 14c and the like, the slit 31 is provided.

By forming the pillar trim 30 into such a shape and by providing the slit 31, the slit 31 can be arranged on a surface facing to the front in the front-and-rear direction of the vehicle. As a result, the slit 31 can be arranged at a position at which the direction of the seat belt 10 that is pulled out toward the vehicle front at the time of wearing (line L1 in FIG. 5) is not bent at an intermediate position, so that the pillar trim 30, which is the interior member, can be prevented from exerting an influence on the arrangement of the seat belt 10 at the time of wearing.

Also, by providing the concave portion 30z, the seat belt 10 can be brought closest to the center pillar 20 easily, so that an effect of alleviating the interference with the pillar trim 30 in a location in which the movement is large can also be achieved.

Further, in this embodiment, there is provided a piece portion 31a formed by folding the edge portion of the slit 31 to the inside of the pillar trim 30 on the vehicle front side. By the presence of this piece portion 31a, the cover 14e of the seat belt 10 pulled to the vehicle front at the time of wearing (line L1) is protected, and the cover 14e can be prevented from being damaged by the edge of the slit 31.

Also, in this embodiment, as shown in FIG. 5, the position of a terminal edge 31b in an upper part of the slit 31 is provided on a line (W2 in FIG. 5) on which the wire 14d in the cover 14e in a state in which the seat belt system 1 is not worn (line L2 in FIG. 5) passes, and the tip end portion of the terminal edge 31b is formed into an arcuate shape having a diameter at least larger than the diameter of the wire 14d.

Further, at an intermediate position of the edge portion located on the rear side in the front-and-rear direction of vehicle of the slit 31, a convex portion 31c is provided. This convex portion 31c is provided on a line (W1 in FIG. 5) on which the wire 14d in the cover 14e in a state in which the seat belt system 1 is worn (line L1 in FIG. 5) passes, and the tip end portion thereof is formed into an arcuate shape having a diameter at least larger than the diameter of the wire 14d.

Therefore, the slit 31 has a triangular shape like a yacht sail. Thereby, both at the time when the seat belt is worn and at the time when it is stored, the laying line of the wire 14d in the cover 14e can be held without bending. Further, a line 31d in the edge portion from the lower end opening portion 31s to the terminal edge 31b of the slit 31, a line 31e in the edge portion from the terminal edge 31b to the convex portion 31c, and a line 31f in the edge portion from the convex portion 31c to the lower end opening portion 31s are formed in an arcuate shape such as to be convex toward the inside of the slit 31. Therefore, the width of the slit 31 can be made as narrow as possible, and hence the inside of the slit 31 is invisible.

As described above, according to the embodiment of the present invention, a protective member or a cover for preventing the influence of an external force exerted by the passenger's foot etc. at the time of getting on and off and of water at the time of rainfall need not be provided. Also, reinforcement for installing the lap anchor 14 is not needed, and the strength of a hole portion for installing the retractor 11 in the center pillar 20 can be improved.

Also, the pretensioner mechanism of the lap anchor 14 can be accommodated in the center pillar 20 in a compact manner without impairing the assemblability of the pillar trim 30, which is the interior member, so that the degree of freedom of the layout of the lap anchor 14 can be increased. Also, both at the time when the seat belt is worn and at the time when it is not worn, the belt line on the lap anchor 14 side of the seat belt 10 can be kept in an ideal state, and the interference between the seat belt 10 and the pillar trim 30 can be avoided.

The above is a description of one embodiment of the present invention. The present invention is not limited to the above-described embodiment, and various modifications and changes can be made based on the technical concept of the present invention.

The invention claimed is:

1. In a vehicle having a cabin and a central pillar, the pillar having a vehicle-side portion and a cabin-side portion, an attachment construction for a seat belt system comprising:
   a pretensioner mechanism having a gas generator and a tubular cylinder portion connected to the gas generator; and
   a lap anchor having a wire and a pulley for fixing one end of a seat belt to a vehicle body, the lap anchor being connected to the pretensioner mechanism;
   an interior member covering the cabin-side portion of the pillar, the lap anchor, and the cylinder portion;
   wherein the cylinder portion or the cylinder portion and the gas generator are arranged between the vehicle-side portion and the cabin-side portion;
   wherein the cylinder portion is arranged so as to extend substantially along an up-and-down direction of the pillar.

2. The attachment construction of claim 1 wherein the cylinder portion includes a tip end portion, and wherein the lap anchor includes a fixing means that connects the tip end portion to the pillar.

3. The attachment construction of claim 1 further comprising a retractor mounting hole, wherein the cylinder portion is arranged across the retractor mounting hole.

4. The attachment construction of claim 1 wherein the lap anchor is fixed to the pillar.

5. The attachment construction of claim 3 further comprising a retractor and a reinforcing member disposed on the pillar for fixing the retractor, wherein the lap anchor is fixed in a range in which the reinforcing member is installed.

6. The attachment construction of claim 1 wherein the interior member includes a lower part and a slit portion having an open end and being disposed in the lower part, wherein the seat belt connected to the lap anchor is guided to a cabin through the slit portion, and a connection range of the seat belt is arranged so as to be exposed to the cabin.

7. The attachment construction of claim 6 wherein the interior member further includes a concave portion having a bottom surface being disposed in the lower part and facing toward the vehicle-side portion of the pillar;
   wherein the slit portion is disposed on the concave portion.

8. The attachment construction of claim 6 wherein the wire has a wire diameter;
   wherein the slit portion further includes a slit tip end portion, an upper edge, a lower edge, and a terminal edge opposite the open end;
   wherein the terminal edge is disposed on a line on which the wire passes when the wire is connected to the lap anchor in a state in which the seat belt system is not in use; and
   wherein the slit tip end portion forms an arcuate shape having a slit diameter at least larger than the wire diameter.

9. The attachment construction of claim 6 wherein the wire has a wire diameter;
   wherein the slit portion further includes an upper edge, a lower edge having a convex portion having a convex tip end portion, and a terminal edge opposite the open end;
   wherein the convex portion is disposed on a rear side of the lower edge with respect to a front-and-rear direction of the vehicle, the convex portion being further disposed on a line on which the wire passes when it is connected to the lap anchor in a state in which the seat belt system is in use; and wherein the convex tip end portion forms an arcuate shape having a convex diameter at least larger than the wire diameter.

10. The attachment construction of claim 9 wherein at least any one of a line between the open end and the terminal edge, a line between the terminal edge and the convex portion, and a line between the convex portion and the open end forms an arcuate shape so as to be oriented in a convex manner with respect to the area between the upper edge and the lower edge.

11. The attachment construction of claim 1 wherein the gas generator includes an insertion port, a harness, and a connector, the insertion port connecting the harness and the connector for inputting detection signals from a sensor for detecting the collision of a vehicle.

12. The attachment construction of claim 11 wherein a signal from a sensor for detecting the collision of a vehicle is inputted via the harness and the connector, whereby the gas generator generates a gas that causes the seat belt to be pulled by the pressure of the generated gas.

13. The attachment construction of claim 1 further comprising a retractor for fixing the other end of a seat belt to a vehicle body.

14. The attachment construction of claim 1 wherein the cylinder portion is externally mounted on the gas generator.

15. The attachment construction of claim 1 further comprising a bracket, wherein the cylinder portion includes an upper part, and wherein the bracket connects the upper part to the pillar.

16. The attachment construction of claim 1 wherein the cylinder portion includes a cylindrical inner surface and a cylindrical outer surface.

17. The attachment construction of claim 1 further comprising an anchor plate for fixing the lap anchor and pretensioner mechanism to the vehicle body, the anchor plate having an attachment end portion and a support end portion, the attachment end portion extending in a substantially vertical direction, and the support end portion extending in a slantwise direction that is nonparallel to a substantially vertical direction.

18. The attachment construction of claim 17 wherein the gas generator is mounted on the attachment end portion of the anchor plate and the cylinder portion is mounted on the gas generator.

19. In a vehicle having a cabin and a central pillar, the pillar having a vehicle-side portion and a cabin-side portion, an attachment construction for a seat belt system comprising:
- a pretensioner mechanism having a gas generator and a tubular cylinder portion connected to the gas generator; and
- a lap anchor having a wire and a pulley for fixing one end of a seat belt to a vehicle body, the lap anchor being connected to the pretensioner mechanism;
- wherein the cylinder portion or the cylinder portion and the gas generator are arranged between the vehicle-side portion and the cabin-side portion;
- wherein the cylinder portion is arranged along the pillar in a substantially vertical orientation.

* * * * *